United States Patent
Shinn et al.

(10) Patent No.: US 10,242,051 B2
(45) Date of Patent: Mar. 26, 2019

(54) EFFICIENT MULTI-TENANT SPATIAL AND RELATIONAL INDEXING

(71) Applicant: MICROSOFT TECHNOLOGY LICENSING, LLC, Redmond, WA (US)

(72) Inventors: Eugene Shinn, Seattle, WA (US); Harish Jayanti, Redmond, WA (US); Abhishek Prateek, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 15/213,726

(22) Filed: Jul. 19, 2016

(65) Prior Publication Data

US 2016/0328444 A1 Nov. 10, 2016

Related U.S. Application Data

(63) Continuation of application No. 13/892,471, filed on May 13, 2013, now Pat. No. 9,424,291.

(51) Int. Cl.
*G06F 17/30* (2006.01)

(52) U.S. Cl.
CPC .... *G06F 17/30457* (2013.01); *G06F 17/3087* (2013.01); *G06F 17/30241* (2013.01); *G06F 17/30312* (2013.01); *G06F 17/30867* (2013.01)

(58) Field of Classification Search
CPC ......... G06F 17/30312; G06F 17/30241; G06F 17/30457; G06F 17/30867; G06F 17/3087
USPC .......... 707/722, 741, 736, 743, 769
See application file for complete search history.

(56) References Cited

U.S. PATENT DOCUMENTS

| | | | |
|---|---|---|---|
| 6,868,421 B1* | 3/2005 | Lin | G06F 17/30241 |
| 6,999,958 B2 | 2/2006 | Carlson et al. | |
| 7,272,501 B2* | 9/2007 | Dorfman | G06F 17/30241 342/357.31 |
| 7,475,060 B2* | 1/2009 | Toyama | G06F 17/30241 |

(Continued)

FOREIGN PATENT DOCUMENTS

WO 2009155741 A1 12/2009

OTHER PUBLICATIONS

"Non-Final Office Action Issued in U.S. Appl. No. 13/892,471", dated Oct. 22, 2015, 6 Pages.

(Continued)

*Primary Examiner* — Shiow-Jy Fan
(74) *Attorney, Agent, or Firm* — Shook, Hardy & Bacon L.L.P.

(57) ABSTRACT

Methods, computer systems, and computer-storage media are provided for increasing the efficiency of a multi-tenant geospatial data index. Efficiency is increased by using a multi-tenant model for storing and serving the data, processing raw geospatial data received from tenants into a runtime-optimized format, and by partitioning tenant geospatial data into a processor memory portion and a file system memory portion. Efficiency is also increased by executing a staged upload of the processor memory portion and the file system memory portion to a subset of host machines in order to check for invalid data before uploading the data to the remaining host machines. Additionally, efficiency is increased by optimizing geospatial search queries using query filters stored in a query filter cache, and executing the query filters initially against the processor memory.

16 Claims, 5 Drawing Sheets

(56) References Cited

U.S. PATENT DOCUMENTS

| | | | | |
|---|---|---|---|---|
| 7,532,979 | B2* | 5/2009 | Fuchs | G01C 21/32 |
| | | | | 701/438 |
| 7,865,836 | B1 | 1/2011 | Speriongano et al. | |
| 8,250,052 | B2 | 8/2012 | Barnett | |
| 8,984,099 | B1 | 3/2015 | Giencke et al. | |
| 2002/0078174 | A1 | 6/2002 | Sim et al. | |
| 2005/0004903 | A1* | 1/2005 | Tsuda | G06F 17/3087 |
| 2007/0143345 | A1* | 6/2007 | Jones | G06F 17/30241 |
| 2007/0168370 | A1 | 7/2007 | Hardy | |
| 2007/0198586 | A1 | 8/2007 | Hardy et al. | |
| 2008/0243908 | A1* | 10/2008 | Aasman | G06F 17/30241 |
| 2009/0010533 | A1 | 1/2009 | Hung | |
| 2009/0254572 | A1* | 10/2009 | Redlich | G06Q 10/06 |
| 2009/0259686 | A1* | 10/2009 | Figueroa | G06F 17/30038 |
| 2011/0093803 | A1* | 4/2011 | Ohazama | G06F 17/30241 |
| | | | | 715/764 |
| 2013/0238652 | A1 | 9/2013 | Burris | |
| 2013/0325903 | A1 | 12/2013 | Rohlf et al. | |
| 2014/0032533 | A1 | 1/2014 | Hersans et al. | |
| 2014/0089343 | A1 | 3/2014 | Burris et al. | |
| 2014/0181130 | A1 | 6/2014 | Davis et al. | |
| 2015/0026190 | A1 | 1/2015 | Black | |

OTHER PUBLICATIONS

"Non-Final Office Action Issued in U.S. Appl. No. 13/892,471", dated Feb. 25, 2016, 27 Pages.

"Notice of Allowance Issued in U.S. Appl. No. 13/892,471", dated May 26, 2016, 8 Pages.

Akdogan, et al., "Voronoi-based Geospatial Query Processing with MapReduce", Second IEEE International Conference on Cloud Computing Technology and Science, IEEE Computer Society, Nov. 30, 2010, 8 pages.

Zhong, et al., "Towards Parallel Spatial Query Processing for Big Spatial Data", 2012 IEEE 26th International Parallel and Distributed Processing Symposium Workshops & PhD Forum, May 21, 2012, pp. 2085-2094.

Oracle Spatial Developer's Guide, "Indexing and Querying Spatial Data", published Nov. 3, 2013, http://www.comp.dit.ie/btierney/Oracle11gDoc/appdev.111/b28400/sdo_index_query.htm, 7 pages.

Malensek, et al., "Exploiting Geospatial and Chronological Characteristics in Data Streams to Enable Efficient Storage and Retrievals", preprint submitted to Future Generation Computer Systems Jul. 27, 2012, 31 pages.

Mouratidis, et al., "Continuous Monitoring of Spatial Queries in Wireless Broadcast Environments", in IEEE Transactions on Mobile Computing, Oct. 2009, 14 pages.

\* cited by examiner

US 10,242,051 B2

EFFICIENT MULTI-TENANT SPATIAL AND RELATIONAL INDEXING

CROSS-REFERENCE TO RELATED APPLICATIONS

This application having Ser. No. 15/213,726 and entitled "Efficient Multi-Tenant Spatial and Relational Indexing," is a continuation application of co-pending U.S. application Ser. No. 13/892,471, entitled "Efficient Multi-Tenant Spatial and Relational Indexing," and filed May 13, 2013. The entirety of the aforementioned application is incorporated by reference herein.

BACKGROUND

Although relational data stores can be used to index and serve geospatial data using an inverted index, these systems are often not optimized for location-based search queries. Because of this, the execution of location-based search queries against the relational data stores often results in a long latency period before search results are returned. For example, in existing systems there may be a 200 to 400 millisecond lag between when a location-based query is received and when results are returned.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-storage media for, among other things, increasing the efficiency of a relational data store storing geospatial data. Efficiency is first increased by processing raw geospatial data received from tenants into an optimized format that can be efficiently stored in a processor memory portion of a multi-tenant geospatial data index. After processing, each tenant's data is partitioned into a processor memory portion and a file system memory portion, and all of the new tenant data is stored in shared file storage. A staged upload of the tenant data to the processor memory and the file system memory of a subset of host machines is executed in order to check for invalid data before publishing the data to all of the host machines. Each host machine is able to host geospatial data from multiple tenants which also increases efficiency.

Additionally, efficiency is increased by implementing a query optimization process on each of the host machines. Incoming geospatial search queries received from tenants are optimized by retrieving a query filter from a query filter cache associated with the host machine. If a query filter cache does not contain a query filter corresponding to the received search query, the query filter is dynamically compiled and stored in association with the cache. Further, the retrieved query filter is first executed against processor memory of the host machine which also increases efficiency of the system.

BRIEF DESCRIPTION OF THE DRAWINGS

The present invention is described in detail below with reference to the attached drawing figures, wherein.

DETAILED DESCRIPTION

Figure 1:
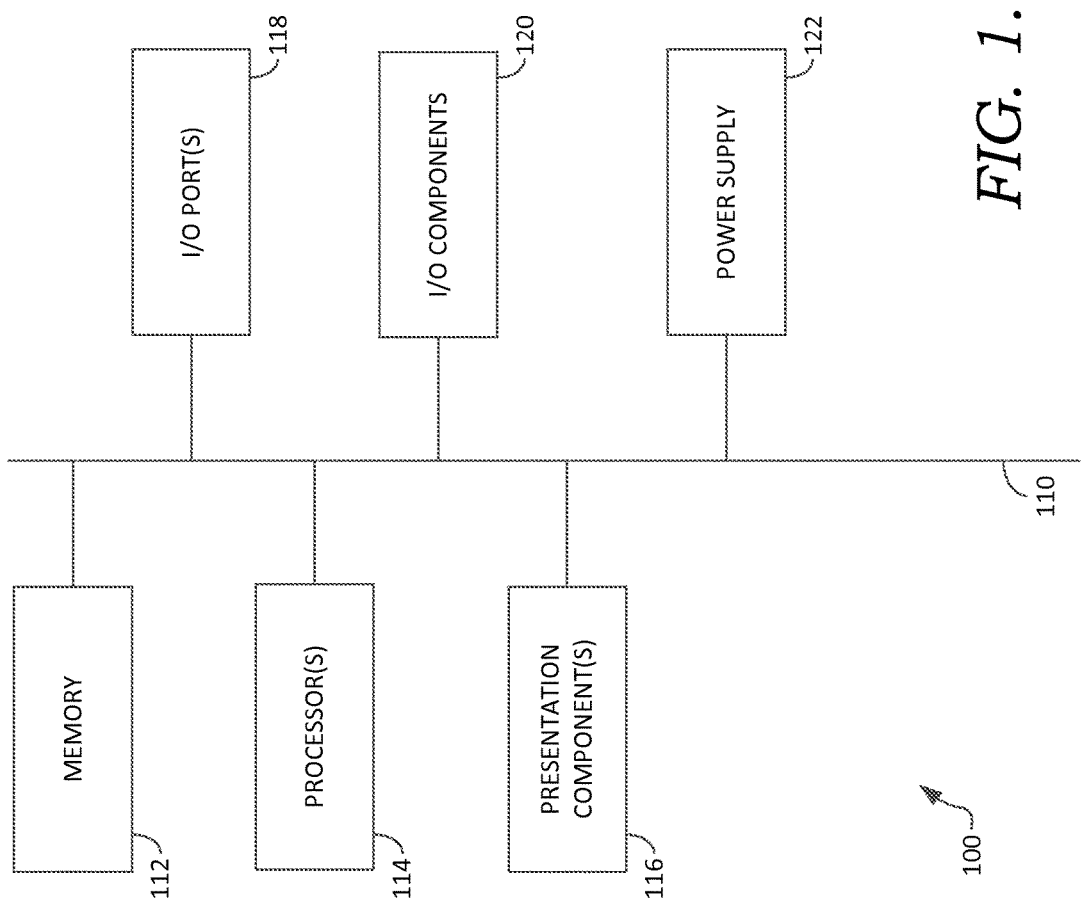
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-storage media for, among other things, effectively utilizing a multi-tenant geospatial data index storing geospatial data associated with a number of different tenants (a tenant may be defined as unique customer party who provides unique geospatial data sets to be stored by the multi-tenant geospatial data index). For the purposes of this application, the term "geospatial data" may be defined as data having one or more geo-coordinates such as latitude and longitude, Cartesian coordinates, and the like. The multi-tenant geospatial data index may be implemented as a cloud-based service having a plurality of processing units or host machines. As such, copies of the multi-tenant geospatial data index may be associated with each of the plurality of host machines. The index is accessible to the tenants through, for example, a Web browser or a desktop or mobile application. The tenants may execute geospatial search queries against the index, and search results are sent to the tenant over a network such as the Internet. Each host machine has a fast processor memory portion and a slower file system memory portion that stores the index. The processor memory, as well as the file system memory, stores all of the tenant data together although different tables may be utilized for each tenant. Each tenant can query its own data using a tenant-specific syntax.

Efficiency may first be increased by utilizing a data publishing service that receives raw geospatial data from tenants and processes the data into a format that can be efficiently stored in the processor memory of host machines. The data publishing service then partitions the data into a processor memory portion and a file system memory portion and stores both portions in association with a shared file storage system. Further, the data publishing service executes a staged uploading of the data to the processor memory and the file system memory of a subset of host machines in order to check for invalid data. If the staged uploading is successful, the data is published to all of the host machines. If, however, the staged uploading is unsuccessful due to invalid data, a previous valid version of the data that is already present on the host machines is marked as the active version and is used in subsequent geospatial search queries executed against the host machines.

Efficiency may also be increased by utilizing a query service on the host machines that receives, for example, a geospatial search query from a tenant having data stored in association with the multi-tenant geospatial data index, parses the query into a parsed structured query, and retrieves a query filter that corresponds to the parsed structured query from a query filter cache on the host machine. The retrieved query filter is first executed against the processor memory of the host machine to retrieve index entries that satisfy the query filter. The index entries retrieved from the processor memory are then used to retrieve full index entries stored in the file system memory of the host machine. Using the received geospatial search query as a guide, relevant information is extracted from the full index entries and is returned to the tenant as a set of search results.

Having briefly described an overview of embodiments of the invention, an exemplary operating environment suitable for use in implementing embodiments of the invention is described. Referring to the drawings in general, and initially to FIG. 1 in particular, an exemplary operating environment for implementing embodiments of the invention is shown and designated generally as a computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, microphone, camera, satellite dish, scanner, printer, wireless device, and the like. Interaction with the illustrative I/O components 120 may be via touch, voice, gesture, and the like.

A distinction will be drawn throughout between storing information to "processor memory" and to "file system memory." The primary distinction between the "processor memory" and the "file system memory" storage involves the speed of I/O operations for each. For example, when data is written to or retrieved from "processor memory" it is implied to have a very fast I/O access time relative to retrieving or writing the same data to a "file system memory." In another example, a processor may maintain information in "processor memory" for access during processing. This processor memory, in an exemplary aspect, is non-persistent memory. For example, when power is interrupted to the non-persistent (i.e., "volatile") memory, the data maintained in the memory is lost. To the contrary, the file system memory, in an exemplary aspect, is persistent (i.e., "non-volatile") memory that is accessible even after a disruption of the power supply.

Traditionally, the fast I/O memory is Random Access Memory ("RAM"), which is used by the system to store data for processing by a processor. RAM stores the data in memory cells that are arranged in grids much like the cells are arranged in a spreadsheet, from which data, in the binary form of 1's and 0's, can be accessed and transferred at random to the processor for processing by the system's software. Data stored in the processor memory may be directly accessed by the processor for processing. This is in contrast to the file system memory, which traditionally may be a disk drive that cannot be accessed at random. Therefore, the file system memory has longer I/O access times than the processor memory and provides persistent storage of data.

Figure 2:
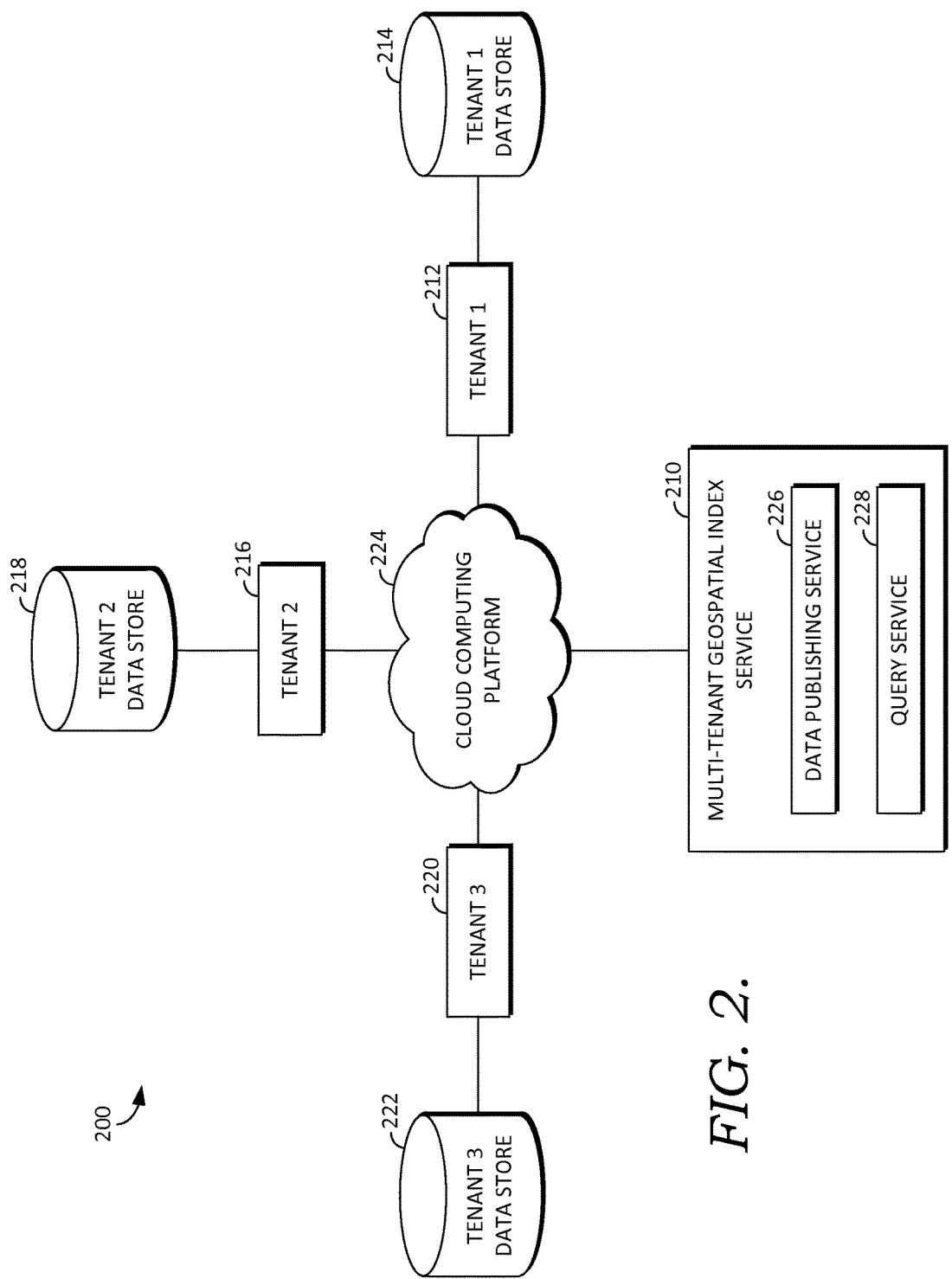
FIG. 2 is a block diagram of an exemplary computing system architecture for increasing efficiency of a multi-tenant geospatial data index by optimizing data storage and optimizing location-based search queries suitable for use in implementing embodiments of the present invention.

Referring now to FIG. 2, a block diagram 200 is provided illustrating an exemplary cloud computing platform 224 for use by a multi-tenant geospatial index service 210. It will be understood and appreciated that the cloud computing platform 224 shown in FIG. 2 is merely an example of one suitable computing system environment and is not intended to suggest any limitation as to the scope of use or functionality of embodiments of the present invention. For instance, the cloud computing platform 224 may be a public cloud, a private cloud, or a dedicated cloud. Neither should the cloud computing platform 224 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of physical machines, virtual machines, host machines, data centers, endpoints, or combinations thereof may be employed to achieve the desired functionality within the scope of embodiments of the present invention. As mentioned, the cloud computing platform 224 comprises a cloud-computing network, which is known in the art as "the cloud."

The cloud computing platform 224 includes a data center configured to host and support the operations of the multi-tenant geospatial index service 210. The service 210 refers to any software, or portions of software, that runs on top of, or accesses storage locations within, the platform 224. It will be appreciated that the cloud computing platform 224 may include multiple computing devices such as the computing devices or portions of the computing devices 100 shown in FIG. 1. The cloud computing platform 224 may include host machines, such as software, applications, operating systems, or programs that are executed by a processing unit to underlie the functionality of the multi-tenant geospatial index service 210. Further, the host machines may include processing capacity, storage locations, and other assets to support the multi-tenant geospatial index service 210.

In one aspect, the cloud computing platform 224 can communicate internally through connections dynamically made between the host machines and computing devices and externally through a physical network topology to resources of a remote network such as with tenants 212, 216, and 220. By way of example, the connections may include, without limitation, one or more local area networks (LANs) and/or wide area networks (WANs). Such networking environments are commonplace in offices, enterprise-wide computer networks, intranets, and the Internet. Accordingly, the network is not further described herein.

As shown in FIG. 2, the multi-tenant geospatial index service 210 is capable of communicating with a number of different data sources, such as the tenants 212, 216, and 220 for the collection of tenant geospatial data. The tenants 212, 216, and 220 may include entities, such as individuals or businesses, which have entity-specific sets of geospatial data that are hosted by the multi-tenant geospatial index service 210. Each of tenants 212, 216, and 220 defines a schema that is used by the multi-tenant geospatial index service 210 to process, index, and create projections of the tenant's set of geospatial data. Each of the tenants 212, 216, and 220 is able to provide updates to its data on an ad-hoc basis and without impact to the other tenant. Further, each of the tenants 212, 216, and 220 may have one or more computing devices, such as the computing device 100 of FIG. 1, for communicating with the multi-tenant geospatial index service 210 to, for example, submit new and updated geospatial data to the service 210, issue location-based search queries to the service 210, and receive search results from the service 210. Although only three tenants are illustrated in FIG. 2, it is contemplated that there may be more than three tenants associated with the multi-tenant geospatial index service 210.

Each tenant 212, 216, and 220 maintains its own data store represented by a tenant 1 data store 214, a tenant 2 data store 218, and a tenant 3 data store 222 associated with the first, second, and third tenants respectively. The data stores 214, 218, and 222 store tenant-specific geospatial data. Further, the tenants 212, 216, and 220 may not be directly or indirectly connected with one another such that the tenant data stores 214, 218, and 222 are utilized only by the data stores' respective tenant. The tenants 212, 216, and 220 send information to the cloud computing platform 224 and not typically directly between one another. In addition, communication between the service 210 and the various tenants 212, 216, and 220 may be via one or more networks, which may comprise one or more wide area networks (WANs) and one or more local area networks (LANs), as well as one or more public networks, such as the Internet, and one or more private networks.

Further, the tenants 212, 216, and 220 may be able to access the service 210 in a variety of ways within the scope of the present invention. For example, in some embodiments, a tenant may have a native computing system, which may be able to communicate with the service 210. In other embodiments, a client application associated with the service 210 may reside or partially reside on one or more of the tenant's computing devices facilitating communication with the service 210. In further embodiments, communication may simply be a web-based communication, using, for example, a web browser to communicate to the service 210 via the Internet. Any and all such variations are contemplated to be within the scope of embodiments of the present invention.

The multi-tenant geospatial index service 210 includes one or more services such as a data publishing service 226 and a query service 228. Processing elements of the data publishing service 226 receive new or updated geospatial data sets from the tenants 212, 216, and 220, process the data into runtime optimized formats, partition the data into a processor memory portion and a file system memory portion, and execute a staged uploading of the data to processor memory and file system memory of a subset of the host machines associated with the multi-tenant geospatial index service 210.

The query service 228 is present on each of the host machines and receives geospatial search queries from the tenants 212, 216, and 220, parses the queries into structured forms, retrieves query filters corresponding to the structured forms from a query filter cache, and executes the retrieved query filters first against the processor memory of the host machine. Index entries in the processor memory that satisfy the query filter are utilized to retrieve full index entries from the file system memory associated with the host machine. Information from the full index entries is returned to the tenants 212, 216, and 220 as search results. If the query filter cache fails to contain a query filter corresponding to the structured form, the query filter is dynamically compiled (e.g., compiled at run time) and is stored in association with the cache.

Figure 3:
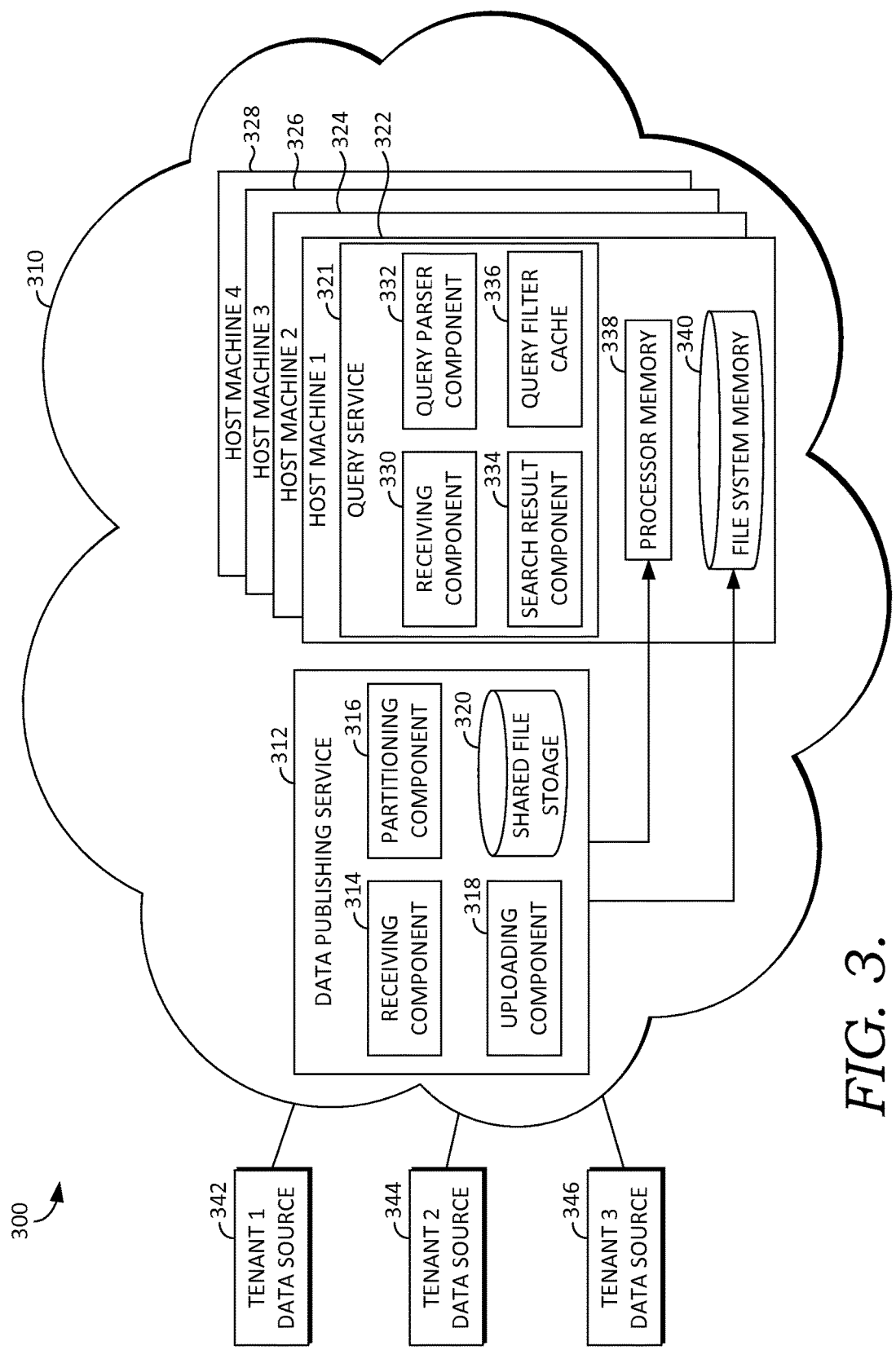
FIG. 3 is a block diagram of an exemplary system for optimizing data storage and optimizing location-based search queries suitable for use in implementing embodiments of the present invention.

FIG. 3 depicts a more detailed view of the multi-tenant geospatial index service 210 (now labeled as multi-tenant geospatial index service 310). As shown, the multi-tenant geospatial index service 310 includes a data publishing service 312, a query service 321, and a plurality of host machines 322, 324, 326, and 328. The data publishing service 312 and the query service 321 correspond to the data publishing service 226 and the query service 228 of FIG. 2. The query service 321 represents an application instance that is executed on each of the plurality of host machines 322, 324, 326, and 328. Each of the host machines 322, 324, 326, and 328 includes processor memory, shown as processor memory 338, and file system memory, shown as file system memory 340. Further, though each is illustrated as a single, independent component, the processor memory 338 and the file system memory 340 may, in fact, be a plurality of storage devices, for instance, a database cluster, portions of which may reside on the host machines 322, 324, 326, and 328. Although only four host machines are shown, it is contemplated that the multi-tenant geospatial index service 310 may include a multitude of host machines sufficient to service the needs of any number of tenants.

FIG. 3 also includes data sources 342, 344, and 346 associated with one or more tenants. The data sources 342, 344, and 346 may correspond to the data stores 214, 218, and 222 of FIG. 2. The data sources 342, 344, and 346 store tenant-specific geospatial data sets, including new data sets and updated versions of already-existing data sets. The geospatial data sets stored in association with the data sources 342, 344, and 346 may be communicated to, for example, the multi-tenant geospatial index service 310 in a number of different ways. For example, a tenant may send a notification to the multi-tenant geospatial index service 310 indicating that the tenant would like to publish an updated geospatial data set. In response to the notification, a receiving component of the data publishing service 312 may extract the updated geospatial data set from the tenant's data source. In another example, the tenant may push an updated geospatial data set to the receiving component. Any and all such aspects, and any combination thereof, are contemplated as being within the scope of the invention.

The data publishing service 312 of the multi-tenant geospatial index service 310 comprises a receiving component 314, a partitioning component 316, an uploading component 318, and a shared file storage system 320. In some embodiments, one or more of the components 314, 316, and 318 may be implemented as stand-alone applications. In other embodiments, one or more of the components 314, 316, and 318 may be integrated directly into the operating system of a computing device such as the computing device 100 of FIG. 1. It will be understood that the components 314, 316, and 318 illustrated in FIG. 3 are exemplary in nature and in number and should not be construed as limiting. Any number of components may be employed to achieve the desired functionality within the scope of embodiments hereof.

The receiving component 314 of the data publishing service 312 is configured to extract and/or receive new or updated raw geospatial data sets from the data sources 342, 344, and 346. Upon receipt, the receiving component 314 is further configured to perform data validation and process the raw data based on tenant-specified parameters prior to the partitioning component 316 partitioning the data. For example, the receiving component 314 may process the data by creating a condensed representation of the data that can be efficiently stored in the processor memory 338.

The partitioning component 316 of the data publishing service 312 is configured to partition the processed geospatial data set into a processor memory portion and a file system memory portion. These portions will ultimately be uploaded to the processor memory 338 and the file system memory 340 of the host machines 322, 324, 326, and 328 associated with the multi-tenant geospatial index service 310. In one embodiment, the processor memory portion and the file system memory portion may each comprise the entire geospatial data set received from the tenant. In another embodiment, the processor memory portion may comprise a subset of the entire portion, and the file system memory portion may comprise the entire geospatial data set. The subset portion may include geospatial data that is frequently utilized by the tenant. Any and all such aspects, and any combination thereof, are contemplated as being within the scope of the invention.

The partitioning component 316 is further configured to bundle the processor memory portion and the file system memory portion of geospatial data and store the bundle in association with the shared file storage 320. The shared file storage 320 represents a file system-type memory where the data is stored on, for example, a disk drive. The shared file storage 320 also stores bundled sets (e.g., processor memory portions and file system memory portions) from other tenants who have provided new or updated geospatial data sets to the data publishing service 312.

The uploading component 318 of the data publishing service 312 is configured to extract bundled sets of data from the shared file storage 320 and execute a staged uploading of all of the tenant bundled data to the processor memory 338 and the file system memory 340 of the host machines 322, 324, 326, and 328. The processor memory portion of the data is uploaded to the processor memory 338, and the file system memory portion is uploaded to the file system memory 340.

In order to prevent a geospatial data update containing invalid data from corrupting all of the host machines 322, 324, 326, and 328, the uploading component 318 first uploads the updated geospatial data sets to a subset of the host machines. For example, the uploading component 318 may first upload the data to the host machines 322 and 324. The uploading process is monitored by the uploading component 318. If the upload is successful, the uploading component 318 proceeds to upload the bundled tenant data to the remaining host machines 326 and 328. If however, the upload is unsuccessful, the uploading component 318 is configured to indicate that an already-uploaded and valid version of the tenant geospatial data set on the host machines 322, 324, 326, and 328 should be utilized by the query service 321.

The query service 321 of the multi-tenant geospatial index service 310 includes a receiving component 330, a query parser component 332, a search result component 334, and a query filter cache 336. The query service 321 represents an application instance that is executed on each of the host machines 322, 324, 326, and 328. In some embodiments, one or more of the components 330, 332, and 334 may be implemented as stand-alone applications. In other embodiments, one or more of the components 330, 332, and 334 may be integrated directly into the operating system of a computing device such as the computing device 100 of FIG. 1. It will be understood that the components 330, 332, and 334 illustrated in FIG. 3 are exemplary in nature and in number and should not be construed as limiting. Any number of components may be employed to achieve the desired functionality within the scope of embodiments hereof.

The query filter cache 336 comprises volatile processor memory and stores compiled versions of query filters. As will be explained in greater depth below, once a query filter is selected, the query filter is executed against the processor memory 338 to retrieve tenant geospatial data index entries that satisfy the query filter. The query filters stored in the cache 336 are tenant-specific and are executed against the tenant's geospatial data stored in the processor memory 338.

The receiving component 330 of the query service 321 is configured to receive geospatial search queries from tenants having data hosted by the multi-tenant geospatial index service 310. The query parser component 232 of the query service 321 is configured to parse a geospatial search query received from a tenant based on parameters specified by the tenant to generate a parsed structured query. The query parser component 332 is further configured to access the query filter cache 336 to retrieve a query filter corresponding to the parsed structured query. If the query filter cache 336 does not contain a query filter corresponding to the parsed structured query, a query filter corresponding to the parsed structured query is dynamically compiled and stored in the query filter cache 336. Each query filter stored in the query filter cache 336 corresponds to geospatial search queries having a particular pattern. For instance, geospatial search queries from a tenant specifying a geographic feature such as a lake or a mountain would all utilize the same query filter.

The search result component 334 is configured to execute a query filter first against the processor memory 338 to retrieve entries that satisfy the query filter. The entries may represent a subset of geospatial data that is frequently used by the tenant. Included with the entries that satisfy the query filter are pointers that specify where the full index entries may be found on the file system memory 340; the full index entries represent the entire set of geospatial data corresponding to the query filter. Using the pointers as a guide, the search result component 334 is further configured to retrieve the full index entries satisfying the query filter from the file system memory 340. The search result component 334, using the received geospatial search query as a reference, extracts geospatial data from the full index entries that satisfy the geospatial search query. The extracted information is presented to the tenant as a set of geospatial search results.

Figure 4:
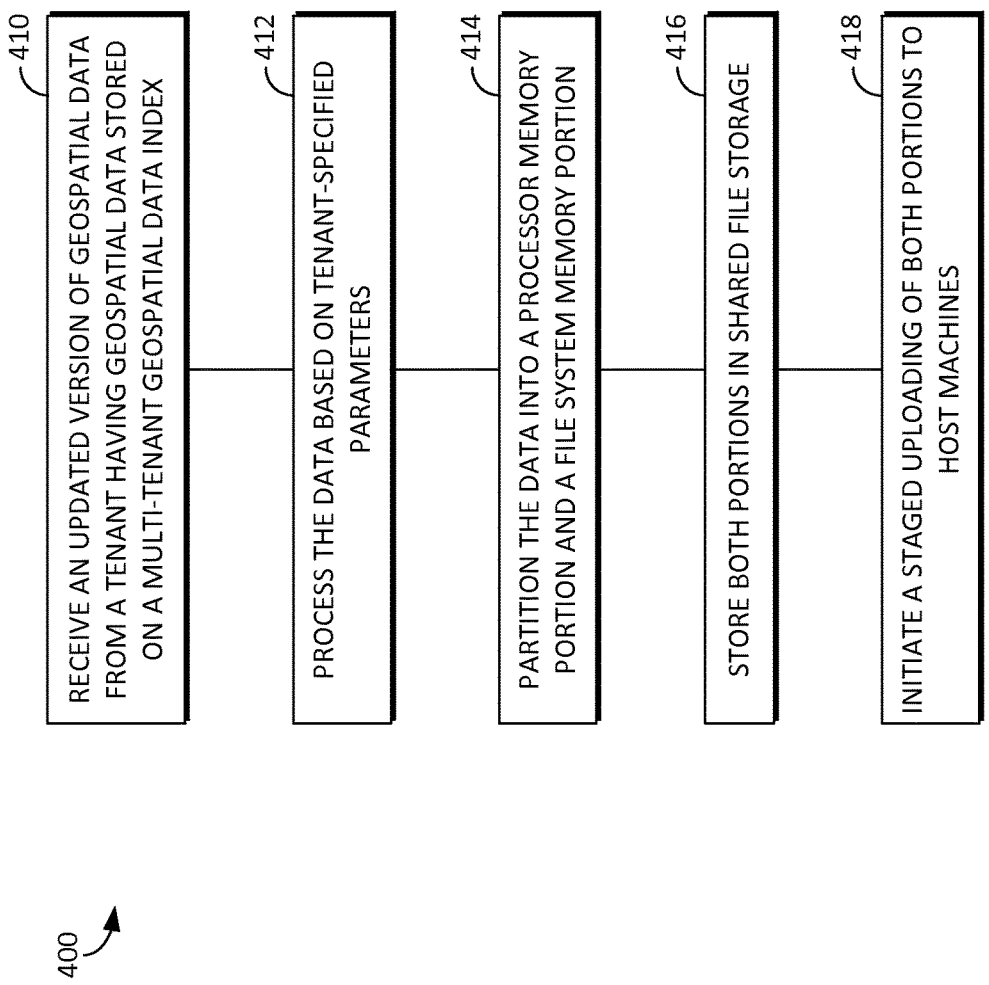
FIG. 4 is a flow diagram of a method of processing raw geospatial data into a format optimized for processor memory, partitioning the data into a processor memory portion and a file system memory portion, and executing a staged upload of the partitioned geospatial data to processor memory and file system memory of a subset of host machines to check for invalid data in accordance with an embodiment of the present invention.

Turning now to FIG. 4, a flow diagram is depicted of an exemplary method 400 of processing raw geospatial data received from a tenant having data stored in association with a multi-tenant geospatial data index. At a step 410, geospatial data is received from a tenant. The tenant may be the tenant 212, 216 or 220 of FIG. 2. The geospatial data received from the tenant may represent a new set of geospatial data or an updated version of an already-existing valid set of geospatial data stored in association with the processor memory and the file system memory of the multi-tenant geospatial data index. The updated data set may be received by a receiving component of a data publishing service such as the receiving component 314 of FIG. 3. At a step 412, the receiving component may process the data set using tenant-specified parameters into a runtime-optimized format. For instance, the raw data may be processed into a condensed representation of the data that can be efficiently stored in processor memory.

At a step 414, the processed geospatial data is partitioned into a processor memory portion and a file system memory portion by a partitioning component such as the partitioning component 316 of FIG. 3. Both the processor memory portion and the file system memory portion may each comprise the entire set of geospatial data received from the tenant. Alternatively, the processor memory portion may represent a subset of the entire set of geospatial data and the file system memory portion may represent the entire set of geospatial data. For example, the processor memory portion may represent frequently-used portions of the set of geospatial data.

At a step 416, the partitioning component bundles the processor memory portion and the file system memory portion and stores the bundle in association with a shared file storage system. The shared file storage system also stores bundled sets of geospatial data associated with other tenants.

At a step 418, the bundled data stored in association with the shared file storage is uploaded to host machines by an uploading component such as the uploading component 318 of FIG. 3. The uploading is staged to counteract the corrupting effects of invalid data. For example, the bundled data is first uploaded to a sub-portion of the host machines; the processor memory portion of the data is uploaded to the processor memory of the sub-portion, and the file system memory portion is uploaded to the file system memory of the sub-portion of the host machines. The uploading is monitored. If the upload is successful, the bundled data is uploaded to the remaining host machines. If, however, the upload is unsuccessful, the uploading component terminates the upload and marks an already-existing valid version of the data stored on the host machines as the active version to be used in executing geospatial search queries. Executing a staged upload as described, helps to reduce system outages caused by corrupt data.

Figure 5:
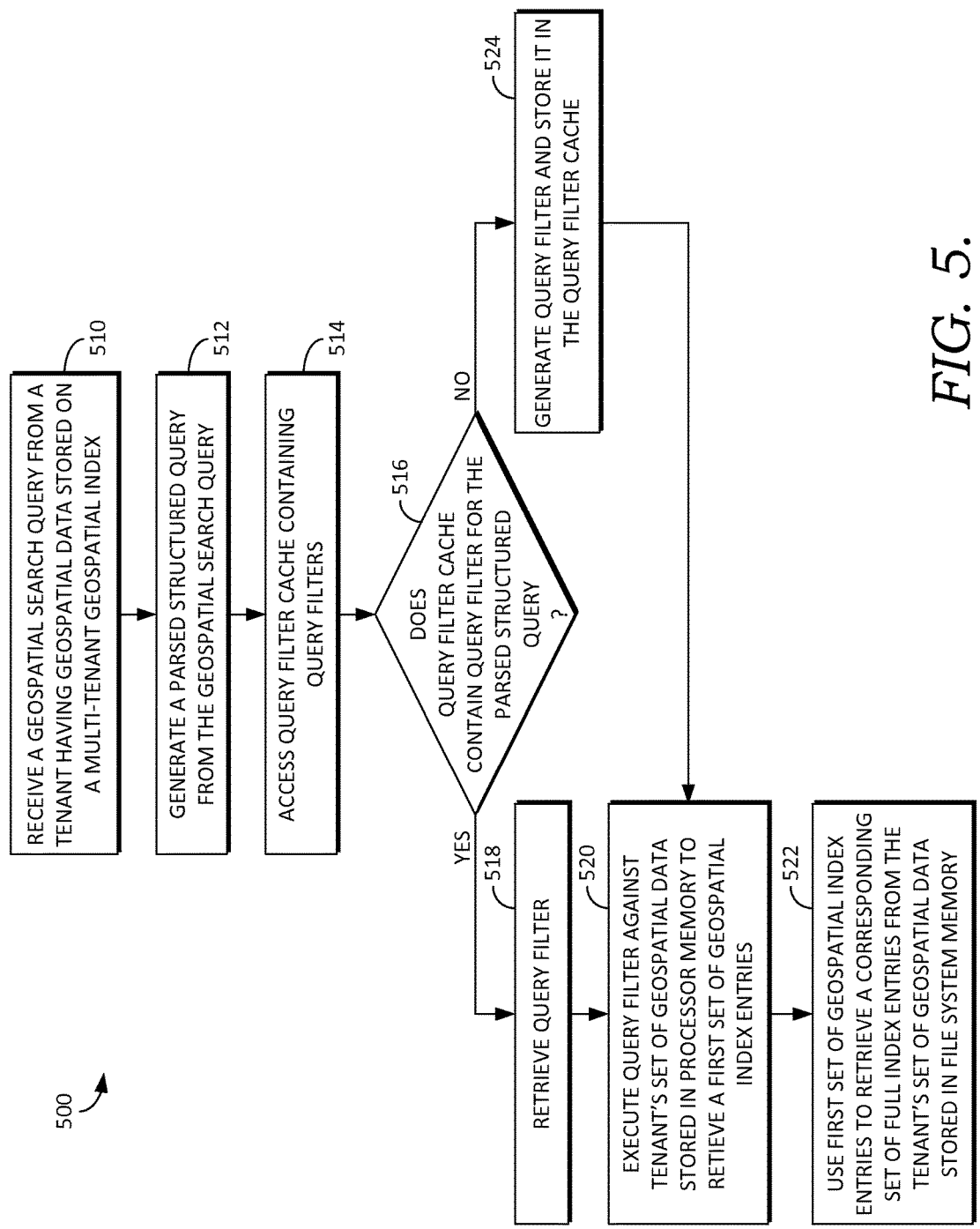
FIG. 5 is a flow diagram of a method of optimizing location-based search queries for geospatial data using query filters stored in a query filter cache, dynamically compiling query filters in the query filter cache, and executing the retrieved query filters first against processor memory of a host machine in accordance with an embodiment of the present invention.

Turning now to FIG. 5, FIG. 5 depicts a flow diagram of an exemplary method 500 of optimizing queries for geospatial data and executing the optimized queries first against processor memory of a host machine. At a step 510, a geospatial search query is received by a receiving component of a query service residing on a host machine such as the receiving component 330 of FIG. 3. The geospatial search query is provided by a tenant having geospatial data hosted on the multi-tenant geospatial data index.

At a step 512, the received geospatial search query is parsed using parameters specified by the tenant to generate a parsed structured query. This is carried out by a query parser component such as the query parser component 332 of FIG. 3. At a step 514, the query parser component accesses a query filter cache associated with the query service, such as the query filter cache 336 of FIG. 3. The query filter cache contains compiled query filters that correspond to parsed structured queries. At a step 516, a determination is made whether the query filter cache contains a query filter that corresponds to the parsed structured query. If, at a step 524, it is determined that the cache does not contain a corresponding query filter, a query filter is dynamically compiled and stored in association with the cache. The now-compiled query filter can be used to retrieve index entries from the processor memory of the host machine as explained below and as shown by the line connecting the step 524 and the step 520. If, however, at a step 518, it is determined that the query filter cache does contain a corresponding query filter, the query filter is retrieved. Compiling query filters on demand at run-time increases the efficiency of the system as compared to traditional SQL databases that pre-define queries ahead of time.

At a step 520, the query filter is first executed against the processor memory of the host machine to retrieve entries that satisfy the query filter. The entries retrieved from the processor memory include pointers that specify where full index entries may be found in the file system memory of the host machine. These actions may be carried out by a search result component such as the search result component 334 of FIG. 3. Once the full index entries are retrieved from the file system memory, the search result component identifies and extracts information that satisfies the received geospatial search query and returns this information to the tenant as a set of search results. Optimizing geospatial search queries and executing the optimized queries first against the processor memory of the host machine helps to increase the efficiency of the index. For instance, using the methods and systems described above, query latency times may be reduced from around 200 to 400 milliseconds to 20 to 40 milliseconds.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer-storage media having computer-executable instructions embodied thereon that, when executed, perform a method of optimizing queries for geospatial data and executing the optimized queries first against processor memory of a host machine, the method comprising:

receiving a geospatial search query from a tenant having a set of geospatial data stored in association with a file system memory of the host machine and a subset of the set of geospatial data stored in association with the processor memory of the host machine, wherein the subset of the set of geospatial data represents geospatial data frequently utilized by the tenant, and wherein the file system memory comprises non-volatile memory and the processor memory comprises non-persistent memory;

generating a parsed structured query from the geospatial search query;

determining whether a query filter cache contains a query filter corresponding to the parsed structured query;

when it is determined that the query filter cache contains the query filter corresponding to the parsed structured query, retrieving from the query filter cache the query filter corresponding to the parsed structured query;

when it is determined that the query filter cache does not contain the query filter corresponding to the parsed structured query, dynamically generating the query filter corresponding to the parsed structured query and storing the query filter in association with the query filter cache;

executing the query filter against the subset of the tenant's set of geospatial data stored in association with the processor memory of the host machine to retrieve a first set of geospatial data index entries satisfying the query filter, wherein the first set of geospatial data index entries represents the subset of the set of geospatial data; and using the first set of geospatial data index entries to retrieve a second set of full geospatial data index entries from the tenant's set of geospatial data stored in association with the file system memory of the host machine, wherein the second set of full geospatial data index entries represents the set of geospatial data.

2. The media of claim 1, wherein the host machine stores a plurality of sets of geospatial data associated with a plurality of tenants.

3. The media of claim 1, further comprising:

filtering the second set of full geospatial data index entries based on the geospatial search query to produce a set of geospatial search results; and returning to the tenant the set of geospatial search results.

4. The media of claim 1, wherein the parsed structured query is generated based on parameters specified by the tenant.

5. The media of claim 1, wherein the query filter cache contains tenant-specific query filters.

6. A computerized method carried out by a host machine having at least one processor for optimizing queries for geospatial data and executing the optimized queries first against processor memory of a host machine, the method comprising:

receiving a geospatial search query from a tenant having a set of geospatial data stored in association with a file system memory of the host machine and a subset of the set of geospatial data stored in association with the processor memory of the host machine, wherein the subset of the set of geospatial data represents geospatial data frequently utilized by the tenant, and wherein the file system memory comprises non-volatile memory and the processor memory comprises non-persistent memory;

generating a parsed structured query from the geospatial search query;

determining whether a query filter cache contains a query filter corresponding to the parsed structured query;

when it is determined that the query filter cache contains the query filter corresponding to the parsed structured query, retrieving from the query filter cache the query filter corresponding to the parsed structured query;

when it is determined that the query filter cache does not contain the query filter corresponding to the parsed structured query, dynamically generating the query filter corresponding to the parsed structured query and storing the query filter in association with the query filter cache;

executing the query filter against the subset of the tenant's set of geospatial data stored in association with the processor memory of the host machine to retrieve a first set of geospatial data index entries satisfying the query filter, wherein the first set of geospatial data index entries represents the subset of the set of geospatial data; and using the first set of geospatial data index entries to retrieve a second set of full geospatial data index entries from the tenant's set of geospatial data stored in association with the file system memory of the host machine, wherein the second set of full geospatial data index entries represents the set of geospatial data.

7. The method of claim 6, wherein the host machine stores a plurality of sets of geospatial data associated with a plurality of tenants.

8. The method of claim 6, further comprising:
filtering the second set of full geospatial data index entries based on the geospatial search query to produce a set of geospatial search results; and
returning to the tenant the set of geospatial search results.

9. The method of claim 6, wherein the parsed structured query is generated based on parameters specified by the tenant.

10. The method of claim 6, wherein the query filter cache contains tenant-specific query filters.

11. A system for optimizing queries for geospatial data and executing the optimized queries first against processor memory of a host machine, the system comprising:
a first computing device associated with a host machine, the computing device having one or more processors and one or more computer-storage media;
a file system memory associated with the host machine, the file system memory comprising non-volatile memory; and
a processor memory associated with the host machine, the processor memory comprising non-persistent memory, wherein the host machine:
receives a geospatial search query from a tenant having a set of geospatial data stored in association with the file system memory of the host machine and a subset of the set of geospatial data stored in association with the processor memory of the host machine, wherein the subset of the set of geospatial data represents geospatial data frequently utilized by the tenant;
generates a parsed structured query from the geospatial search query;
determines whether a query filter cache contains a query filter corresponding to the parsed structured query;
when it is determined that the query filter cache contains the query filter corresponding to the parsed structured query, retrieves from the query filter cache the query filter corresponding to the parsed structured query;
where it is determined that the query filter cache does not contain the query filter corresponding to the parsed structured query, dynamically generates the query filter corresponding to the parsed structured query and stores the query filter in association with the query filter cache;
executes the query filter against the subset of the tenant's set of geospatial data stored in association with the processor memory of the host machine to retrieve a first set of geospatial data index entries satisfying the query filter, wherein the first set of geospatial data index entries represents the subset of the set of geospatial data; and
uses the first set of geospatial data index entries to retrieve a second set of full geospatial data index entries from the tenant's set of geospatial data stored in association with the file system memory of the host machine, wherein the second set of full geospatial data index entries represents the set of geospatial data.

12. The system of claim 11, wherein the host machine stores a plurality of sets of geospatial data associated with a plurality of tenants.

13. The system of claim 11, wherein the host machine further:
filters the second set of full geospatial data index entries based on the geospatial search query to produce a set of geospatial search results; and
returns to the tenant the set of geospatial search results.

14. The system of claim 11, wherein the parsed structured query is generated based on parameters specified by the tenant.

15. The system of claim 11, wherein the query filter cache contains tenant-specific query filters.

16. The system of claim 11, wherein the query filter cache comprises volatile memory.

\* \* \* \* \*